Jan. 15, 1929.  1,698,832

T. TOWNSEND

ROTARY CUTTER

Original Filed July 8, 1924

Inventor:
Thomas Townsend,
By Churdahl, Parker & Carlson
Attys.

Patented Jan. 15, 1929.

1,698,832

UNITED STATES PATENT OFFICE.

THOMAS TOWNSEND, OF PITTSBURGH, PENNSYLVANIA, ASSIGNOR OF ONE-HALF TO HARRY F. ANDERSON, OF MARION, INDIANA, AND ONE-HALF TO JAMES BOYCE, OF HOLLAND, MICHIGAN.

ROTARY CUTTER.

Original application filed July 8, 1924, Serial No. 724,793. Divided and this application filed May 26, 1926. Serial No. 111,710.

This invention relates generally to cutting tools and in particular to a rotary cutting tool for forming openings in sheet metal and the like. This application is a division of applicant's copending application Serial No. 724,793, filed July 8, 1924.

In the manufacture of illuminated signs, the outlines of letters, figures or designs are formed by means of some opaque material generally sheet metal. It has heretofore been the practice to cut the outlines by means of shears, or, if the metal sheet is thick, it has been necessary to employ cold chisels. If the outlines are in part, at least, irregular, there will be a bending of the edges of the metal in turning the shears to form such irregular outlines, and when employing cold chisels the edges of the sheet will be more or less bent. In the completed sign the edges of the opaque portion should be fitted closely against the glass sheet back of the opaque sheet, and hence it is the practice to pass the sheet through rolls after the outline has been formed thus to eliminate the bends or kinks. But because the metal is more or less stretched when being bent by the shears or chisel, such rolling will only partially flatten the edges.

The object of the invention as described herein is to provide means whereby the outlines desired may be cut in a sheet without any bending or stretching of the metal.

A more particular object of the invention is to provide a suitable metallic cutter having a particular type of tooth arrangement.

In the accompanying drawings there is illustrated a disk cutter embodying the principles of the invention, in which cutter may be mounted in a machine such as that described and claimed in the above mentioned copending application. When so mounted the cutter may be operated to cut a design in a sheet of metal or the like.

Figure 1:
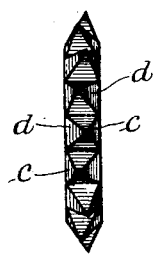
Fig. 1 is an enlarged view of the periphery of the cutter in elevation.

It is to be understood that other embodiments of the invention involving different constructions and arrangements of the teeth are herein contemplated in so far as they fall within the scope of the appended claims.

The character of the tool is dependent to some extent upon the particular manner in which the tool is mounted and operated with reference to the work. Although various means may be provided for this purpose in the present instance I prefer to utilize the invention by mounting a cutter in a machine such as that shown in my above mentioned copending application, it being understood that any other preferred method or means may be employed for a similar purpose.

In the present instance a sheet of metal 10 is illustrated which is to be operated upon for outlining therein a design by cutting into the material. The metal is laid flat upon a suitable surface and the cutter is preferably supported by means not shown herein adapted to ride upon the upper surface of the sheet so that the lower edge of the cutter projects below the bottom of the sheet.

A cutter of relatively small diameter (as, for example, seven-eighths of an inch) is employed in order readily to cut along curved lines having short radii, such as are encountered in the outlines of letters, etc.

Because of the frequent desirability of using the cutter on these curved outlines of short radii, the cutter of my invention in addition to being of a small diameter, is arranged to cut a slot in the sheet metal which is wider than any tooth of the cutter, thus to enable the operator to turn the cutter, without raising it from the sheet, into a path out of a straight line, either in a curved path or in a direction angular to a given straight portion. I provide a cutter which has more than one set of teeth, and one such that along the edge of the cutter no two teeth of one set are directly adjacent each other, and further one such that the teeth of each set are substantially in different parallel planes.

In the present instance the cutter which I have chosen to illustrate the invention comprises one having but two sets of teeth thus to form very narrow slots. The teeth are staggered about the periphery of the cutter yet are overlapping in their cutting portions. The cutter comprises a disk 23 having a suitable central opening such as the square hole 24 for mounting it on a suitable shaft (not shown). Sixteen teeth are herein provided which are in the present instance pyramidal in shape and equally spaced about the periphery of the disk 23. One set of teeth 25 in Fig. 3 has the tooth apex at the right of the central plane of the cutter and the other set 26 has the tooth apex at the left of the central plane of the cutter. The correspondingly positioned faces of the adjacent teeth are similar but reverse in form. The pyramid forming each tooth is not a regular pyramid but is a lopsided one having substantially a square base with the axis through the apex moved first to the right in one set and then to the left in the other set. Thus the front faces *a* and the rear faces *b* of all teeth form equal angles with the periphery of the disk 23, while the respectively opposite lateral faces of adjacent teeth form the same angle with the parallel sides of the disk. In the present instance the short lateral faces *c* of the pyramidal teeth approach coincidence with one side of the disk 23 while the longer lateral faces *d* approach a perpendicular relation to the sides of the disk. It is obvious that the longer lateral faces *d* of the pyramids have no cutting contact with the work and hence may have any desired form, so long as they fall inwardly along the axis of the cutter from the lateral faces *c* of the adjacent teeth which have a cutting action.

Figure 2:
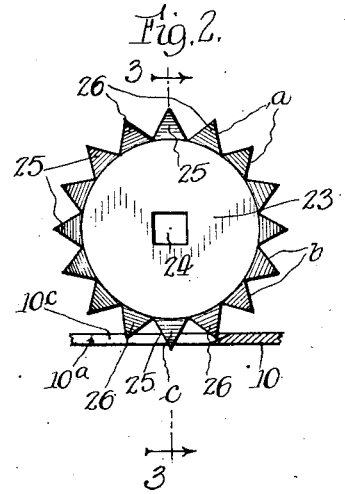
Fig. 2 is an enlarged face view of the cutter.
Figure 3:
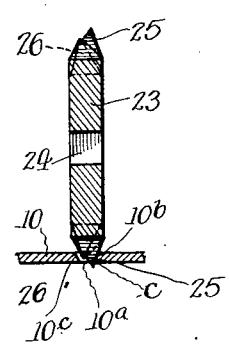
Fig. 3 is a cross sectional view of the cutter along the line 3—3 of Fig. 2.

In operating the above described cutter upon a sheet of metal, it will be apparent that because adjacent peripheral teeth are staggered there is no obstacle to prevent turning the cutter in the slot cut by it, each tooth being in contact at only one of its lateral faces with the edge of the slot. As indicated in Figs. 2 and 3 the sheet of metal 10 is being cut to form slot 10ᵃ. Tooth 25 is deepest in the slot and its short lateral face *c* (foremost in the plane of the drawing of Fig. 2) is in contact with the nearest edge 10ᵇ of the slot (Fig. 3) while its rear face is spaced away from the back edge 10ᶜ of the slot 10ᵃ. The adjacent teeth 26 when rotated into the slot will contact the rear edge 10ᶜ and will be spaced away from the other edge 10ᵇ. But the adjacent teeth 26 are raised out of the slot by the curvature of the disk when tooth 25 is deepest in the slot (as in Fig. 2) thus permitting the whole of each adjacent tooth 26 to be free from contact with the edges of the slot. This freedom and the space between tooth 25 and the edge 10ᶜ permit motion of the cutter angularly to the slot 10 and gives rise to the ease with which it can be turned therein to cut out angular or curved designs.

It will thus be seen that I have provided a form of cutter which when properly mounted and operated can be used to cut curved or angular slots in a sheet of metal or the like for the particular purpose of forming letters, designs, stencils, etc. It is to be understood, however, that other embodiments of the invention may be susceptible to other uses for which the present disclosed embodiment may not be particularly adaptable.

I claim as my invention:

1. A cutting disk provided with teeth substantially pyramidal in shape and having their sides disposed at an acute angle with respect to the sides of the disk, the angle formed by the same sides of alternate teeth with the axis of the disk being greater than the corresponding angle of sides of the other teeth.

2. A cutting disk provided with teeth substantially pyramidal in shape, the angle formed by the cutting edge of one tooth with the axis being greater than the angle formed by the corresponding face of an adjacent tooth.

3. A cutting disk having an arrangement of peripheral teeth thereon with but one tooth at any one space across the periphery, said teeth comprising a plurality of sets of teeth the tips of which lie substantially in different parallel planes, the outer faces of the teeth being tapered away from the sides of the disk.

4. A cutting disk having peripherally arranged teeth thereon comprising two sets of teeth, the teeth of the two sets being relatively staggered yet overlapping in a direction across the periphery, and the outer face of each tooth being tapered from the side of the disk nearest its tip.

5. A cutter having at each side face a plurality of peripheral teeth with lateral faces inclined away from the plane of said face, adjacent teeth at one face being separated by other teeth having lateral faces inwardly of the cutter along the axis thereof beyond the lateral faces of the first mentioned teeth.

6. A cutter for cutting a slot in sheet metal or the like comprising a cutter body, peripheral teeth on said body, some of said teeth being arranged to cut one edge of the slot, and other teeth being arranged for cutting the other edge of the slot, each edge-cutting tooth being further so arranged that it is free from contact with the edge not cut by it, the cutting paths of said teeth overlapping in the middle of the slot.

In testimony whereof, I have hereunto affixed my signature.

THOMAS TOWNSEND.